United States Patent [19]

Sirota

[11] Patent Number: 5,037,302

[45] Date of Patent: Aug. 6, 1991

[54] EDUCATIONAL TOY WITH A REPAIRABLE DEFECT FOR TEACHING HUMANISTIC VALUES TO A CHILD

[76] Inventor: Vladimir Sirota, 72nd Mt. Vernon St., Apt. 1B, Boston, Mass. 02108

[21] Appl. No.: 372,554

[22] Filed: Jun. 28, 1989

Related U.S. Application Data

[63] Continuation-in-part of Ser. No. 126,830, Nov. 27, 1987, abandoned, which is a continuation of Ser. No. 887,365, Jul. 17, 1987, abandoned.

[51] Int. Cl.[5] .................. G09B 19/00; G09B 25/00; A63H 33/30; A63H 13/02
[52] U.S. Cl. .................... 434/236; 434/95; 434/366; 434/374; 434/396; 434/346; 446/474; 446/296; 446/321; 446/395; 446/98; 446/433; 446/95
[58] Field of Search ............... 434/95, 366, 373, 374, 434/395, 396, 236, 99, 260, 62, 219, 238, 348, 346; 446/98, 99, 97, 295, 296, 472, 474, 321, 395, 433, 901, 95

[56] References Cited

U.S. PATENT DOCUMENTS

| | | |
|---|---|---|
| 356,695 | 1/1887 | Reid et al. . |
| 645,440 | 3/1900 | Thruston ........................... 434/95 |
| 1,850,115 | 3/1932 | McCarthy .......................... 434/95 |
| 3,325,917 | 6/1967 | Kinnaman ........................ 446/296 |
| 3,783,553 | 1/1974 | Goozner . |
| 4,213,269 | 7/1980 | Grogg ............................... 446/433 |
| 4,681,555 | 7/1987 | Natiw ............................ 446/372 X |

FOREIGN PATENT DOCUMENTS 2420247 11/1975 Fed. Rep. of Germany ...... 434/238

Primary Examiner—Danton D. DeMille
Attorney, Agent, or Firm—Jerry T. Kearns

[57] ABSTRACT

An educational device for teaching humanistic values to a child is in the form of a toy manufactured with at least one recognizable abused condition or defect. The toy is packaged and marketed with repair apparatus enabling a child to permanently substantially eliminate the abused condition and effective upon completion of the repair to leave permanent visual reminder of the original abused condition.

7 Claims, 4 Drawing Sheets

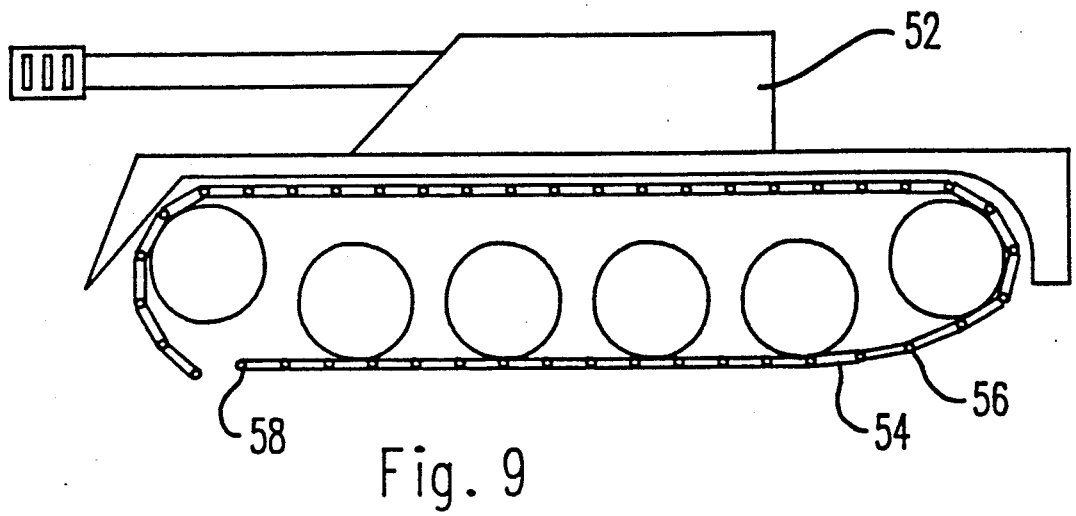
Fig. 9
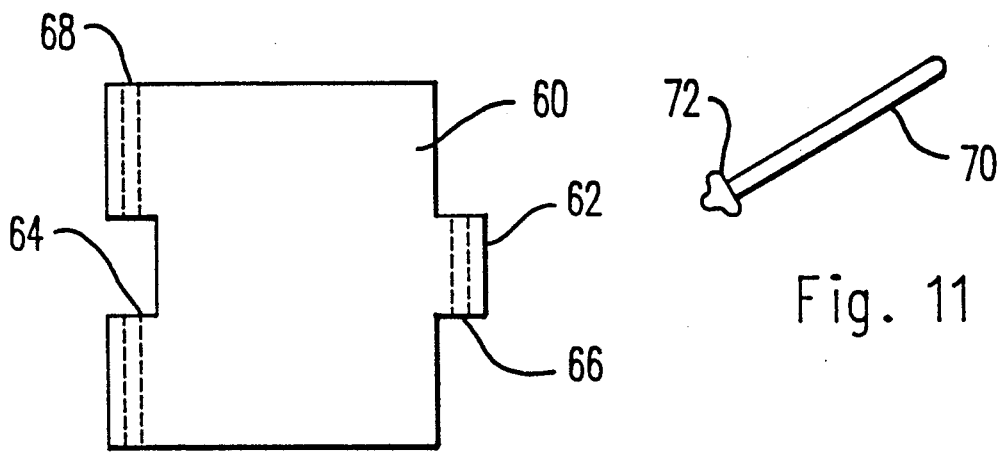
Fig. 10
Fig. 11
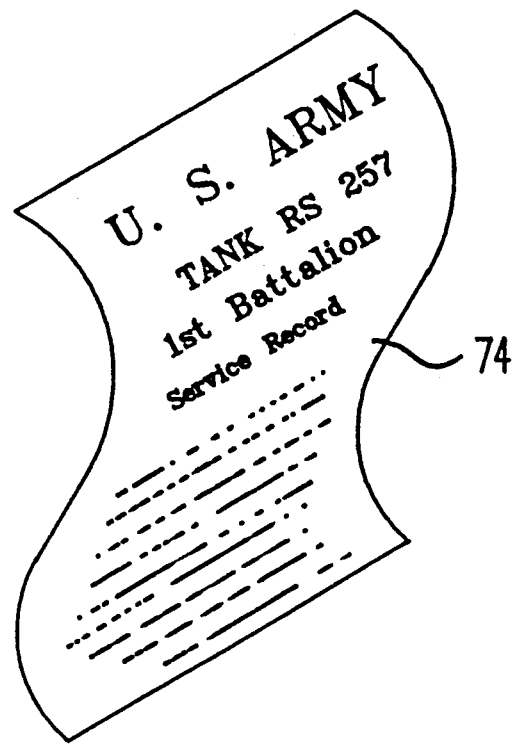
Fig. 12

EDUCATIONAL TOY WITH A REPAIRABLE DEFECT FOR TEACHING HUMANISTIC VALUES TO A CHILD

RELATED APPLICATIONS

This application is a continuation-in-part of U.S. Ser. No. 126,830, filed Nov. 27, 1987, now abandoned which is a continuation of U.S. Ser. No. 887,365, filed July 17, 1987 now abandoned.

BACKGROUND OF THE INVENTION

1. Field of the Invention

The present invention relates to educational devices and toys, and more particularly pertains to a new and improved educational device for teaching humanistic values to a child. Toys are known which are actually formed as learning devices. However, these conventional forms of educational toys do not instill humanistic values in young children. The principle on which the present invention is based relates to a psychological conditioning aspect, and in particular to the development in a child, from an early age, of a feeling of humanism. Conventional forms of educational toys are designed to enable a child to repeatedly perform some sort of repair or simulated assistance activity. For example, various types of medical toys are available which enable a child to play "doctor" or "nurse". However, these types of toys actually encourage a child to repeatedly abuse or render the toy or doll into an injured or sick condition. Thus, these conventional educational toys actually encourage a child to inflict repeated harm or torture on the toy. The present invention seeks to overcome this problem by providing an educational device or toy which encourages a child to develop humanistic values by encouraging the child to repair and eliminate an initial abused condition or manufactured defect in the toy, without subsequently reinjuring or damaging the toy. The present invention also seeks to provide a permanent visual reminder to the child of the assistance which he or she has rendered to the toy, thus developing a bond of affection between the child and the toy. Being surrounded by hundreds of beautiful and "happy" toys, a child suddenly finds a toy which is in trouble, and immediately rushes to provide help. From this moment, a great process of formation of a real human being, and not just a consumer begins. The relationship between a child and a toy starts in this case from the fact that the child does not take something from the toy, but instead gives a part of his heart to the toy. After the child has rendered his or her help and assistance, one of the greatest joys comes to him or her, namely the joy of accomplishing goodwill. Such a toy becomes especially dear and close to the child's heart. This is a natural human emotion because individuals love people first of all for the good things which they have done for them. As a result, a special type of relationship develops between a child and toys constructed in accordance with the present invention. Children who play with such toys develop the most important qualities of a civilized person, namely that any pleasure or joy must be earned, and not just received free.

2. Description of the Prior Art

Various types of educational devices and toys are known in the prior art. Typical examples of such educational devices and toys are to be found in U.S. Pat. Nos. 2,781,611, 2,959,891, 4,257,188, 4,075,782 and 4,585,424. The user of these toys activates a special mechanism which reproduces the symptoms of various infectious diseases. Then the reproduction of the symptoms is stopped by switching on another mechanism and switching off the first-mentioned mechanism. The object of these toys, which are as a matter of fact, illustrations to textbooks, is mainly to assist parents and medical staff in explaining a medical cure to children by demonstrating to the latter on the toys the process of reversal of the symptoms of a sickness from which a child suffers. Thus, it is important to emphasize that the psychological peculiarity of the relation between the child and the above toys is one-sided and directed to satisfaction of the needs of the child, and not of the toy. Thus, the child in this relationship only receives, but does not give anything in return to toy, a relationship which in fact occurs in all known forms of toys.

While the above mentioned devices are suited for their intended usage, none of these devices disclose a toy initially provided with a manufactured abused condition or defect in conjunction with apparatus enabling a child to permanently substantially eliminate the abused condition or defect and effective upon repair to leave a permanent visual reminder of the original, abused condition or defect. Additionally, none of the conventional forms of educational toys assist in the formation of humanistic values in children by allowing them to render help or assistance to a toy to repair a nonrecurring abused condition or defect, and leaving, subsequent to repair, a permanent visual reminder to reinforce the positive feelings generated in the child. Inasmuch as the art is relatively crowded with respect to these various types of educational devices, it can be appreciated that there is a continuing need for and interest in improvements to such educational devices, and in this respect, the present invention addresses this need and interest.

SUMMARY OF THE INVENTION

In view of the foregoing disadvantages inherent in the known types of educational devices now present in the prior art, the present invention provides an improved educational device. As such, the general purpose of the present invention, which will be described subsequently in greater detail, is to provide a new and improved educational device which has all the advantages of the prior art educational devices and none of the disadvantages.

To attain this, representative embodiments of the concepts of the present invention are illustrated in the drawings and make use of a toy provided with a manufactured abused condition or defect in conjunction with apparatus enabling a child to permanently substantially eliminate the defect or abused condition, and effective upon use to leave a permanent visual reminder of the eliminated defect or abused condition. In a first embodiment of the invention, the toy may be in the form of a doll provided with a face portion having a simulated removable dirty spot. A mouth on the doll's face has upturned corner portions which are obscured by the removable simulated dirt. Upon removal of the dirt, the upturned corner mouth portions are revealed, simulating a positive facial expression. Additionally, an indelible paint or pigment layer may be provided beneath the removable simulated dirty layer to leave a faint outline of the original dirty facial portion. In a second embodiment of the invention, a doll may be provided with clothing that is torn and/or formed with a removable soiled or stained portion. The doll clothing may additionally be formed with an unsewn seam portion. In a third embodiment of the invention, a toy tank has an endless belt type tread which is initially provided with a damaged or missing tread portion. A replacement tread section and an installation pin are provided with the tank to enable a child to effect the necessary repairs. Additionally, a certificate may be provided which simulates the service history of an actual tank and serves as a commendation to the child for his repair efforts.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved educational device which has all the advantages of the prior art educational devices and none of the disadvantages.

It is another object of the present invention to provide a new and improved educational device which may be easily and efficiently manufactured and marketed.

It is a further object of the present invention to provide a new and improved educational device which is of a durable and reliable construction.

An even further object of the present invention is to provide a new and improved educational device which is susceptible of a low cost of manufacture with regard to both materials and labor, and which accordingly is then susceptible of low prices of sale to the consuming public, thereby making such educational devices economically available to the buying public.

Still yet another object of the present invention is to provide a new and improved educational device which provides in the apparatuses and methods of the prior art some of the advantages thereof, while simultaneously overcoming some of the disadvantages normally associated therewith.

Still another object of the present invention is to provide a new and improved educational device to instill humanistic values in a child at an early age.

Yet another object of the present invention is to provide a new and improved educational device in the form of a toy provided with an originally manufactured abused condition or defect to enable a child to learn humanistic values by providing assistance or help to the toy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 illustrates a toy tank having an endless tread with a missing or defective tread portion.

FIG. 10 is a top plan view illustrating a tread repair portion for repairing the tank of FIG. 9.

FIG. 11 illustrates a pin for installing the repair tread of FIG. 10 in the tank of FIG. 9.

FIG. 12 illustrates a commemorative recognition certificate to recognize a child's repair efforts of the tank illustrated in FIG. 9.

DESCRIPTION OF THE PREFERRED EMBODIMENT

Figure 1:
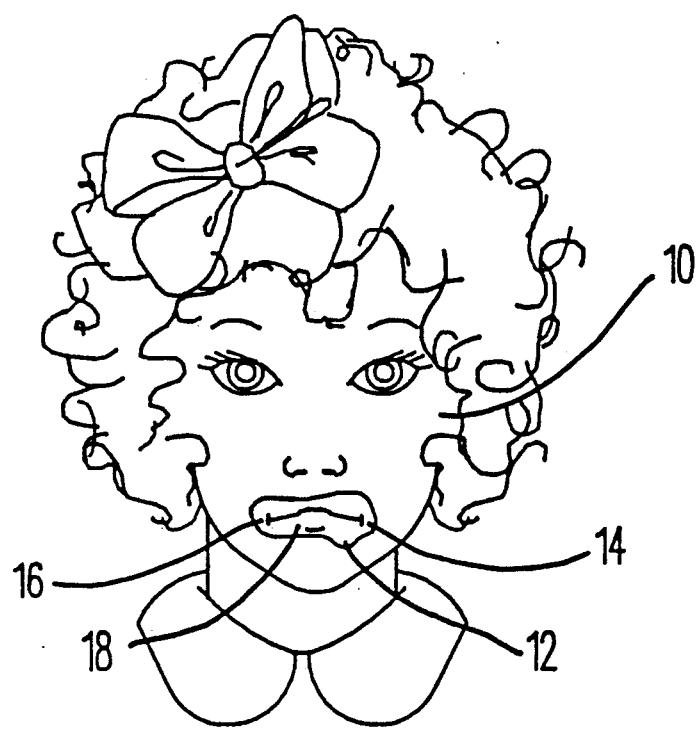
FIG. 1 illustrates a toy in the form of a doll provided with a removable dirty spot on the face of the doll.

With reference now to the drawings, and in particular to FIG. 1 thereof, a new and improved educational device embodying the principles and concepts of the present invention and generally designated by the reference numeral 10 will be described.

More specifically, it will be noted that the first embodiment 10 of the invention is in the form of a toy doll having a facial portion with a removable dirty spot 12 surrounding a mouth 18. Upturned corner portions 14 and 16 of the mouth 18 are obscured by the removable dirty spot 12, thus providing a negative facial expression. The doll 10 may be of any conventional material and the spot 12 may be formed from a water soluble paint, ink or pigment.

Figure 2:
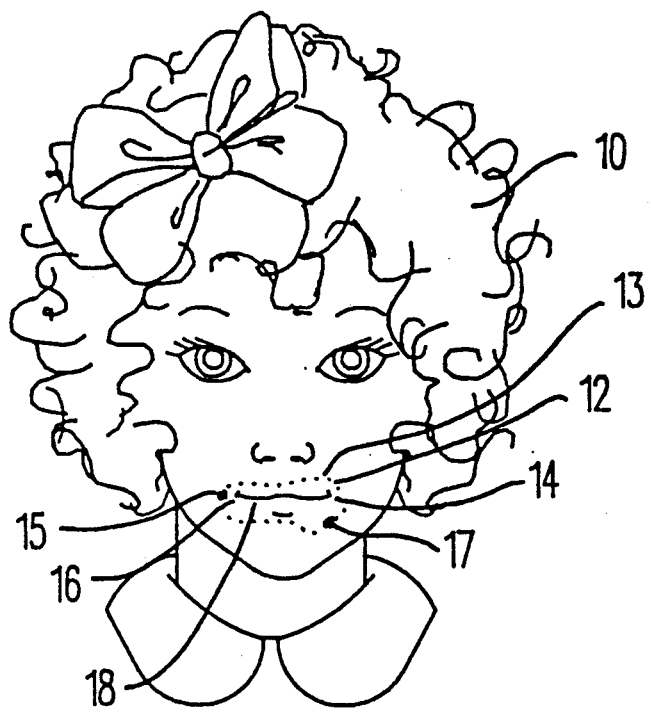
FIG. 2 illustrates the doll of FIG. 1 with the dirty facial spot removed, to reveal an indelible pigmented portion to create a permanent visual reminder of assistance rendered by a child to the doll.

FIG. 2 illustrates the doll 10 in which the dirty spot 12 has been substantially eliminated. It is contemplated that a child will remove the spot 12 by wiping the face of the doll 10 with a damp cloth. Alternatively, the removable dirty spot 12 may be formed of a special water proof material, and a towelette may be provided in a sealed package treated with a special solvent to enable the child to remove the spot from the face of the doll. Upon removal of the dirty spot 12, a permanent outline 13 of the original dirty spot 12 is revealed. The outline 13 is formed from a permanent unremovable pigment embedded in the material utilized to form the doll 10, or may be formed by an indelible paint or ink material. The small spots 15 and 17 may also be provided to serve as an additional visual reminder of the original dirty spot 12. As illustrated, removal of the dirty spot 12 reveals the upturned corner portions 14 and 16 of the mouth 18, thus converting the originally negative facial expression into a positive facial expression.

Figure 3:
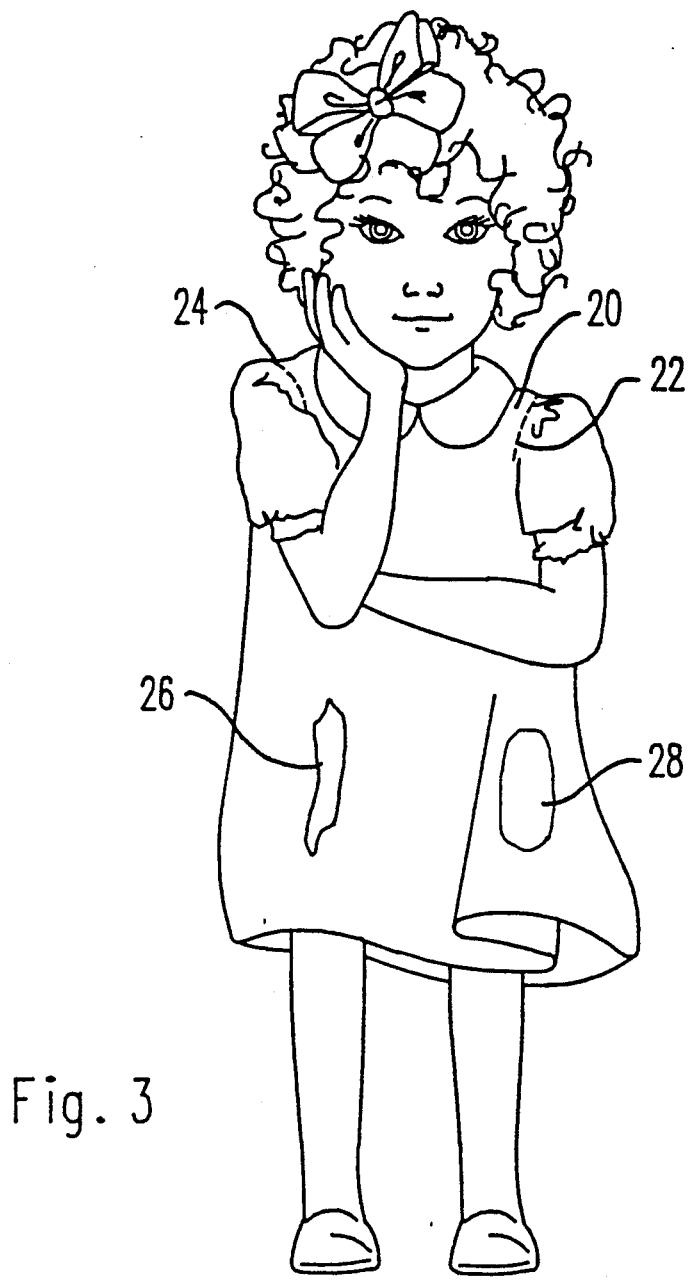
FIG. 3 illustrates a toy in the form of a doll provided with torn and soiled clothing.

FIG. 3 illustrates another toy doll which has clothing 20 including stitched seams 22 and 24. A small tear 26 and/or a soiled spot 28 may be provided on the clothing 20.

Figure 4:
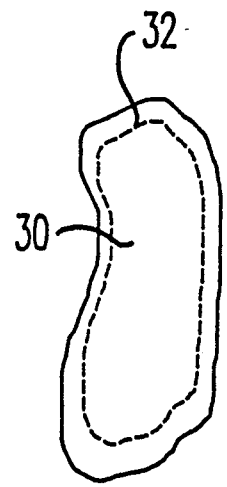
FIG. 4 illustrates a repair patch for repairing the torn doll clothing of FIG. 3.

FIG. 4 is a front view illustrating a repair patch 30 for repairing the tear 26 provided in the doll clothing 20 illustrated in FIG. 3. The repair patch 30 has a predetermined shape corresponding with the tear 26 and is provided with indicia 32 simulating stitching.

Figure 5:
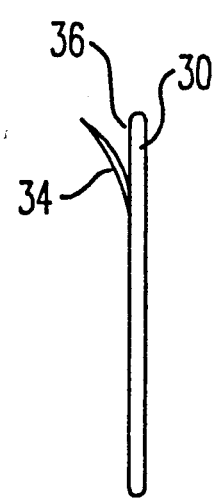
FIG. 5 illustrates a side view of the repair patch of FIG. 4.

As shown in FIG. 5, a back surface 36 of the repair patch 30 is coated with an adhesive which is covered by a removal peel off strip 34. In use, the strip 34 is removed, and the adhesive surface 36 of the repair pads 30 is applied to the doll clothing 20. It should be understood that the adhesive 36 may be provided around only a peripheral portion on the back surface of the patch 30, to engage only the doll clothing portion surrounding the tear 26.

Figure 6:
FIG. 6 illustrates the doll of FIG. 3, with the torn and soiled portions repaired, and having permanent visual reminders of these repairs. The doll clothing of FIG. 6 additionally illustrates an originally unsewn portion for repair by a child.

FIG. 6 illustrates the doll of FIG. 3, with the repair patch 30 applied to repair the original tear 26. The originally soiled portion 28 has been cleaned to leave only a faint permanent indelible outline of the original spot. The soiled portion 28 is preferably originally formed from a water soluble pigment, ink or paint overlying an indelible pigment, ink or paint which is revealed upon wiping with a damp cloth. The doll clothing 20 may also be formed with an only partially sewn seam, as illustrated at the upper portion of the stitched seam 24 joining the arm 40 with the shoulder portion 42. A plurality of preformed holes 44 are preferably provided to assist a child in repairing the unsewn seam portion.

Figure 7:
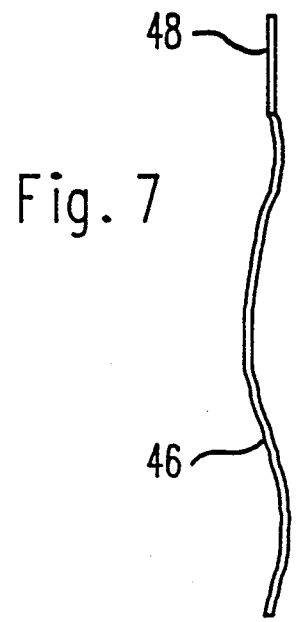
FIG. 7 illustrates a repair thread for repairing the unsewn clothing portion of the doll of FIG. 6.

As shown in FIG. 7, a repair thread 46 is provided with a glue stiffened tip 48 to effect repair of the unsewn seam 24 illustrated in FIG. 6. The glue stiffened tip 48 is preferable to a needle, which maY injure a child.

Figure 8:
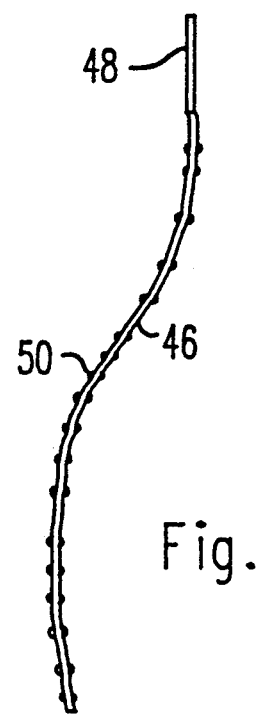
FIG. 8 illustrates another form of repair thread for repairing the unsewn doll clothing portion illustrated in FIG. 6.

FIG. 8 illustrates a slightly modified repair thread 46 which includes a glue stiffened tip 48 to serve as a safety needle and having a coating consisting of a microencapsulation 50 of a chemical such as a dye or bleach which will effect a permanent change in the color of the doll's clothing 20, illustrated in FIG. 6, adjacent the repair portion 44 of the seam 24. Upon repair, the repair thread 46 or the discolored clothing portion forms a permanent visual reminder of the assistance which the child has rendered to the doll. The repair thread 46 may also be formed from a color different from the original thread utilized in constructing the doll's clothing.

FIG. 9 illustrates an additional embodiment of the invention in which a toy tank 52 has an endless belt type tread or track 54 formed from a plurality of tread segments connected by inserted hinge or pivot pins 56. One portion of the tread 54 is damaged or missing, as indicated at 58.

To enable a child to render help or assistance to eliminate the abused condition or manufactured defect 58 of the tank 52 illustrated in FIG. 9, a replacement or repair tread segment 60 is provided, as shown in FIG. 10. The repair segment 60 has a projection 62 and a complementary recess 64 dimensioned to mate with similar components on the tank tread 54. Cylindrical apertures 66 and 68 extend transversely through the tread 60 for the receipt of a hinge or pivot pin to secure the tread section in place.

FIG. 11 illustrates a replacement hinge or pivot pin 70 utilized to effect repair of the tank tread 54 of the tank 52 illustrated in FIG. 9. The replacement pin 70 has an irregularly shaped head portion 72 which is visually distinguishable from the circular heads 56 of the pins originally utilized to form the tread 54. Thus, after replacement of the tread segment 60, a child will have a permanent visual reminder of the help or assistance provided to the tank 52 by virtue of the different color of the replacement tread segment 60 and the irregularly shaped head 72 of the replacement pin 70.

To serve as an additional reinforcement to the positive feeling induced in the child by the assistance provided to the defective toy, a certificate of commendation or recognition 74 may be mailed to the child by the toy manufacturing company upon return of a completed certificate by the child indicating completion of the repair. The certificate 74 illustrated in FIG. 12 preferably has a realistic description of a particular tank and the service record thereof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. An educational toy for teaching humanistic values to a child, comprising:
   a doll;
   clothing on said doll in an initial as marketed condition having at least one removably soiled portion formed from a water soluble material; and
   an indelible layer formed from a non-water soluble material underlying said soiled portion forming a faint outline of said soiled portion upon removal of said removable soiled portion, to form a permanent visual reminder of said soiled portion.

2. An educational toy, comprising:
   a doll having a face with a mouth having upturned corner edges;
   a removable dirty spot on said doll face obscuring said upturned corner edges, such that removal of said dirty spot reveals a positive facial expression; and
   an indelible layer at least partially underlying said removable dirty spot, said indelible layer forming a permanent visual reminder of said dirty spot.

3. An educational toy for teaching humanistic values to a child, comprising:
   a doll;
   clothing on said doll having at least one manufactured torn portion;
   a patch for repairing said torn clothing portion; and
   said patch having a front surface provided with indicia simulating stitching and an adhesive coated back face covered by a removable peel off strip.

4. An educational toy for teaching humanistic values to a child, comprising;
   a doll;
   clothing on said doll having at least one unsewn portion provided with preformed holes to receive a repair thread;
   a repair thread having a glue stiffened tip for sewing said partially unsewn portion through said preformed holes; and
   said repair thread having a different color than a color of original thread utilized to sew said doll clothing, thereby forming a permanent visual reminder of said unsewn portion.

5. An educational toy for teaching humanistic values to a child, comprising:
   a doll;
   clothing on said doll having at least one unsewn portion provided with preformed holes to receive a repair thread;
   a repair thread having a glue stiffened tip for sewing said partially unsewn portion through said preformed holes; and
   said repair thread having an exterior surface provided with a micro-encapsulated chemical coating adapted to be released upon sewing through said preformed holes to change the color of said doll clothing in the vicinity of said partially unsewn portion upon repair, to form a permanent visual reminder of said unsewn portion.

6. An educational toy for teaching humanistic values to a child, comprising:
   a tank;
   said tank having an original tread with a defective tread portion;
   a replacement tread for repairing said defective tread portion;
   said replacement tread having a different color than said original tread, thereby forming a permanent visual reminder of said defective tread portion.

7. The educational toy of claim 6, further comprising:
   originally provided hinge pins in said original tread;
   a replacement hinge pin for connecting said replacement tread having a different shape than said originally provided hinge pins in said original tread, thereby forming a permanent visual reminder of said defective tread portion.

* * * * *